(12) United States Patent
Meyer et al.

(10) Patent No.: US 6,316,527 B1
(45) Date of Patent: Nov. 13, 2001

(54) MODIFIED SAN RESIN BLEND COMPOSITIONS AND ARTICLES PRODUCED THEREFROM

(75) Inventors: Jean-Philippe Gaëton Meyer, Drusenheim; Yannick Jean Yvon Chiquet, Juan les Pins, both of (FR); Fabrizio Trinchero, Domodossola (IT)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/661,827

(22) Filed: Sep. 14, 2000

(30) Foreign Application Priority Data

Sep. 16, 1999 (EP) .................................................. 99402272

(51) Int. Cl.$^7$ .................................................. C08L 25/12
(52) U.S. Cl. .............................. 523/201; 525/70; 525/79; 525/85; 525/86
(58) Field of Search .............................. 523/201; 525/70, 525/79, 85, 86

(56) References Cited

U.S. PATENT DOCUMENTS

| | | |
|---|---|---|
| 3,793,402 | 2/1974 | Owens . |
| 3,878,265 | 4/1975 | Shimamura et al. . |
| 3,971,835 | 7/1976 | Myers et al. . |
| 4,034,013 | 7/1977 | Lane . |
| 4,052,525 | 10/1977 | Ide et al. . |
| 4,243,765 | 1/1981 | Keskkula et al. . |
| 4,393,164 | 7/1983 | McKee et al. . |
| 4,707,513 | 11/1987 | Baer . |
| 4,713,268 | 12/1987 | Carson . |
| 5,252,666 | 10/1993 | Setz et al. . |
| 5,321,056 | 6/1994 | Carson et al. . |
| 5,322,663 | 6/1994 | Lai et al. . |
| 5,336,718 | 8/1994 | Niessner et al. . |
| 5,342,898 | 8/1994 | Seitz et al. . |
| 5,438,099 | * 8/1995 | Fischer et al. ........................ 525/67 |
| 5,534,594 | 7/1996 | Troy et al. . |
| 5,560,994 | 10/1996 | Kitaike et al. . |
| 5,563,227 | 10/1996 | Kitaike et al. . |
| 5,576,385 | 11/1996 | Tiefensee et al. . |
| 5,576,394 | 11/1996 | Chao et al. . |
| 5,599,854 | 2/1997 | Troy et al. . |
| 5,652,306 | 7/1997 | Meyer et al. . |
| 5,668,215 | 9/1997 | Chao et al. . |
| 5,902,845 | 5/1999 | Yoshimi et al. . |
| 5,932,655 | 8/1999 | Auclair et al. . |
| 6,111,012 | 8/2000 | Fischer et al. . |
| 6,130,290 | 10/2000 | Troy et al. . |

FOREIGN PATENT DOCUMENTS

| | | |
|---|---|---|
| 2137428 | 6/1995 | (CA) . |
| 4239436 | 5/1994 | (DE) . |
| 558262 | 1/1993 | (EP) . |
| 558266 | 1/1993 | (EP) . |
| 597275 B1 | 10/1993 | (EP) . |
| 54-48850 | 4/1979 | (JP) . |
| Sho57-34146 | 2/1982 | (JP) . |
| Hei5-339462 | 12/1993 | (JP) . |
| 93/21274 | 10/1993 | (WO) . |

OTHER PUBLICATIONS

European Patent Office Search Report—EP 99402272 dated Mar. 2000.

* cited by examiner

*Primary Examiner*—Jeffrey Mullis
(74) *Attorney, Agent, or Firm*—Jeffrey H. Rosedale

(57) ABSTRACT

Modified SAN resin blend compositions that have good clarity and improved tensile properties compared to unmodified SAN resins are described. The compositions are blends of SAN resins and certain modifiers which are core-shell polymers with (A) a core composed principally of rubbery polymers, such as copolymers of diolefins with vinyl aromatic monomers, such as copolymers of butadiene with styrene, (B) an intermediate stage composed principally of hard polymers, such as polymers or copolymers of vinyl aromatic monomers, and (C) a shell composed principally of vinyl aromatic copolymers that contain hydroxyl functional groups or their equivalents (e.g. styrene/hydroxyalkyl (meth)acrylate copolymers).

14 Claims, No Drawings

MODIFIED SAN RESIN BLEND COMPOSITIONS AND ARTICLES PRODUCED THEREFROM

BACKGROUND

The present invention relates to compositions containing a blend of a styrene-acrylonitrile resin (hereafter referred to as "SAN") and certain modifiers which provides an improved balance of impact resistance and optical clarity to SAN alone. More specifically, the present invention concerns a resin blend containing a styrene-acrylonitrile resin having from 19 to 35 weight percent acrylonitrile (hereafter referred to as "AN") and a modifier which contains a rubbery core, an intermediate hard stage, and a shell containing a hydroxyl group or another functional group which acts in a similar manner as the hydroxyl group.

SAN resins (e.g., copolymers derived from units of styrene and acrylonitrile monomers) exhibit various excellent properties such as resistance to temperature, chemicals, and burning and also exhibit clarity, moldability, and low cost compared to other transparent resins such as polycarbonate ("PC") and polymethylmethacrylate ("PMMA"). However, SAN is currently underutilized as a transparent engineering resin compared to PC and PMMA primarily because it has low elongation at break values and poor impact performance. A SAN resin composition having improved elongation at break values and impact strength while maintaining good clarity would therefore provide a low-cost transparent engineering resin.

Many methods have been proposed to improve the elongation at break and impact strength of SAN resins. Various techniques wherein rubbery polymers or rubber-containing polymers are mixed with SAN have been developed to improve the impact resistance of SAN and thermoplastic materials. One attempt has been made to incorporate a butadiene-based rubbery component into SAN to improve its impact resistance to prepare the so-called acrylonitrile-butadiene-styrene ("ABS") resins. Even when these methods are implemented, however, ABS resins are typically opaque due to the refractive index mismatch and relatively large domain sizes of the SAN and butadiene-rubber phases; typical commercial-grade SAN resins have refractive indices in the range of from 1.56 to 1.58 whereas the refractive index of polybutadiene is about 1.52.

Another attempt has been to blend in certain core-shell polymers comprising a core made of rubbery polymer and a shell, around the core, made of a glassy polymer are excellent agents for improvement of impact strength of SAN where clarity is not an object. However these methods usually involve incorporating by melt-blending some sort of rubbery component having a rather larger domain size and a relatively low (mismatched) refractive index which results in tougher, yet resin compositions which are still opaque. As an example are the addition of methacrylate-butadiene-styrene ("MBS") modifiers, such as PARALOID® EXL-2600 (Rohm and Haas Company), which are known in the art as core-shell polymer particles containing a rubbery polymeric core based on polybutadiene and a hard polymeric shell derived from methyl methacrylate units. Unfortunately such MBS modifiers have refractive indices of about 1.54 and also form opaque blends with SAN resins.

When these prior art methods are used, the SAN resin composition generally exhibits poor clarity due to the refractive index mismatch with the modifier Even when these prior art core-shell modifiers are added to SAN resins and found to produce enhanced elongation at break values, the clarity of SAN resins is destroyed.

McKee et al., U.S. Pat. No. 4,393,164 teaches a transparent, impact-resistant thermoplastic molding material produced from SAN resin and MBS modifiers, but requires from 15 to 70 parts by weight of additional costly PMMA so that the refractive index difference between the MBS modifier and combination of SAN and PMMA is less than 0.005. Thus there is a need for low-cost core-shell modifiers that are compatible with SAN and which have a refractive index in the range of 1.56 to 1.58 so that there is no need to additionally blend in an additional resin such as PMMA to reduce the refractive index in order to prepare engineering resin blends having a good balance of toughness and clarity.

Carson et al., U.S. Pat. No. 5,321,056 teaches modifiers which produce transparent, high notched Izod impact strength blends with amorphous aromatic polyesters. Carson et al. reports that when low concentrations of certain hydroxyalkyl (meth)acrylates are copolymerized with aromatic vinyl monomers to form the shell of core-shell modifiers having RI's in the 1.55 to 1.58 range, very high notched Izod impact strengths are obtained with amorphous polyesters at 30% or lower modifier loadings, and preferably at from 5 to 20% loadings. Although Carson provides for significantly improved impact strength of clear, amorphous aromatic polyester, Carson does not teach or suggest that such modifiers are useful in transparent to translucent SAN resins.

The object of the present invention is to provide SAN blend compositions having improved toughness (impact strength and elongation at break) when they are processed into objects while retaining their clarity. Another object of the present invention is to provide a composition which will overcome the breakage problem when brittle SAN articles are ejected from injection molding equipment. A still further object is to provide transparent to translucent injection molded SAN articles.

STATEMENT OF INVENTION

In the present invention, the elongation at break value of SAN resins is increased substantially by the addition of small amounts of certain core-shell modifiers which disperse very readily in SAN resins. Additionally, the present invention provides a modified SAN resin composition having an improved balance of impact resistance and optical properties over previously known compositions. Specifically, the present invention provides a SAN resin composition which will overcome the breakage problem when brittle SAN articles are ejected from injection molding equipment. These and other objects as will become apparent from the following disclosure are achieved by the present invention.

The modified SAN resin composition of this invention is a blend of (I) at least one SAN resin and (II) at least one core-shell modifier having (A) a rubbery core such as a copolymer containing a diolefin, preferably a 1,3-diene, (B) an intermediate stage comprised mainly of a hard polymer such as a polymer containing a vinyl aromatic monomer, and (C) a shell comprised mainly of a vinyl aromatic monomer (such as styrene), and hydroxyalkyl (meth)acrylate or, in the alternative, another functional monomer which acts in a manner similar to the hydroxyalkyl (meth)acrylate).

The modified SAN resin composition of the present invention comprises:
  (I) from 70 to 99 parts of at least one SAN resin having a refractive index of from 1.56 to 1.58; and
  (II) from 1 to 30 parts of at least one core-shell modifier comprising
    (A) from 15 to 85 parts of a core comprising
      (1) from 40 to 60 percent by weight of units derived from at least one vinyl aromatic monomer,
      (2) from 20 to 60 percent by weight of units derived from at least one 1,3-diene,
      (3) up to 10 percent by weight of units derived from at least one copolymerizable vinyl or vinylidene monomer, and (4) up to 5 percent by weight of units derived from at least one graft-linking or cross-linking monomer;

(B) from 10 to 50 parts of an intermediate stage comprising at least 25 percent by weight of units derived from at least one vinyl aromatic monomer; and (C) from 5 to 35 parts of an outer shell comprising (1) from 2 to 40 percent by weight of units derived from at least one hydroxyalkyl (meth)acrylate, (2) from 60 to 98 percent by weight of units derived from at least one vinyl aromatic monomer, (3) up to 25 percent by weight in the shell of units derived from one or more copolymerizable vinyl or vinylidene monomer, and (4) up to 5 percent by weight of units derived from at least one graft-linking or cross-linking monomer;

the at least one core-shell modifier having a refractive index in the range of from 1.56 to 1.58.

A further variation of the modified SAN resin composition is to provide within the core (A) of the modifier: (1) an inner hard stage and, (2) an outer rubbery stage. The inner hard stage comprises at least 80 percent of units derived from at least one vinyl aromatic monomer, up to 20 percent of units derived from at least one other copolymerizable vinyl or vinylidene monomer, up to 20 percent by weight of units derived from at least one 1,3-diene, and up to 5 percent by weight of units derived from at least one graft-linking or cross-linking monomer.

The cuter rubbery stage comprises up to 60 percent by weight of units derived from a vinyl aromatic monomer, at least 30 percent by weight of units derived from at least one 1,3-diene, up to 10 percent by weight of units derived from at least one compolymerizable vinyl or vinylidene monomer, and up to 5 percent by weight of units derived from at least one graft-linking or cross-linking monomer.

As used throughout this document, the term "stage" is intended to encompass its broadest possible meaning, including the meaning conveyed in prior art such as U.S. Pat. Nos. 3,793,402, 3,971,835, 5,534,594, and 5,599,854, which offer various means for achieving "staged" polymers.

Another aspect of the invention comprises molded parts, bottles, sheet, films, pipes, foams, containers, profiles, or other articles prepared in accordance with the above-mentioned SAN resin blend compositions.

DETAILED DESCRIPTION OF THE INVENTION

It has been found that certain blends of styrene-acrylonitrile copolymer ("SAN") resins and certain core-shell modifiers are unexpectedly tougher than SAN resins without the core-shell modifiers. The modified SAN resin blend compositions of the present invention contain from 70 to 99, preferably from 80 to 95, and most preferably from 80 to 90 parts by weight of a SAN resin. The SAN resin component of the blend composition of use in this invention have copolymer compositions that range from 19 to 35 percent by weight acrylonitrile and 65 to 81 percent by weight styrene. The copolymers can be produced according to all familiar processes, for example, by bulk, solution, suspension or emulsion polymerization, and are readily available from commercial sources such as BASF and Enichem which are further described in the following examples.

Preferably used are SAN resins (SAN copolymers) that are prepared in solution and which comprise the azeotropic composition of 24 to 26 percent by weight acrylonitrile and 74 to 76 percent by weight styrene. The SAN copolymers should have a weight average molecular weight in the range of from 50,000 of 500,000 g/mol. For applications requiring lower melt viscosities, such as injection molding, it is preferred that the SAN copolymer weight average molecular weight is kept below 150,000 g/mol.

Blends of various SAN resins are also suitable. For example, blends of two or more SAN resins may also be used, with SAN resin blends which have the azeotropic copolymer ratio being preferred.

The modified SAN resin blend compositions of the present invention contain from 1 to 30, preferably from 5 to 25, and most preferably from 10 to 20 parts by weight of a certain modifier that produces a large increase in elongation at break, while maintaining excellent impact strength and optical clarity of the SAN resins. These modifiers contain (A) from 15 to 85 parts by weight of a core composed principally of rubbery polymers, such as copolymers of diolefins with vinyl aromatic monomers, such as copolymers of butadiene with styrene, (B) from 10 to 50 parts by weight of an intermediate stage composed principally of hard polymers, such as polymers or copolymers of vinyl aromatic monomers, and (C) from 5 to 35 parts by weight of an outer shell composed principally of vinyl aromatic copolymers that contain hydroxyl functional groups or their equivalents (e.g. styrene/hydroxyalkyl (meth)acrylate copolymers). For example, the core-shell modifiers (i.e. "modifiers") which give this unexpected result contain shells derived from copolymers of vinyl aromatic monomers with certain hydroxyalkyl (meth)acrylates, for example, hydroxyethyl (meth)acrylate (HEMA), hydroxypropyl (meth)acrylate (HPMA), 4-hydroxybutyl acrylate, ethyl alpha-hydroxymethylacrylate, or hydroxyethyl acrylate (HEA), or other copolymerizable monomers containing one or more hydroxyl groups, such as allyl cellosolve, allyl carbinol, methylvinyl carbinol, allyl alcohol, methallyl alcohol, and the like. Also included are other functionalized vinyl monomers which operate in a similar manner, for example, glycidyl methacrylate (GMA), 3,4-epoxybutyl acrylate, acrylonitrile, methacrylonitrile, beta-cyanoethyl methacrylate, beta-cyanoethyl acrylate, cyanoalkoxyalkyl (meth)acrylates, such as omega-cyanoethoxyethyl acrylate, or omega-cyanoethoxyethyl methacrylate, (meth)acrylamides, such as methacrylamide or acrylamide, N-monoalkyl (meth)acrylamides, such as N-methylacrylamide or N-t-butylacrylamide or N-ethyl (meth)acrylamide, or vinyl monomers containing an aromatic ring and an hydroxyl group, preferably non-phenolic, such as vinylphenol, para-vinylbenzyl alcohol, meta-vinylphenethyl alcohol, and the like. It is surprising that the incorporation of these functional monomers in the outer polymer shell do not destroy the compatibility of the modifier in the SAN resins. However, these functional groups can provide for various unexpected benefits in the modified resin blend, such as improved compatibility with other resins (e.g., polyesters) which would not be expected to occur with modified SAN resin blends having modifiers containing units derived solely from nonfunctional monomers such as styrene and alkyl (meth)acrylates.

The monomer concentrations in the core, intermediate stage and shell of the modifier composition are adjusted to provide a refractive index ("RI") to match that of the SAN resin with which they are blended (i.e. 1.56 to 1.58). This produces useful blends having improved properties with many of the commercially-available SAN resins. Almost all rubbery polymers (e.g. cores) have RIs well below this range. Therefore it is necessary that the rubber phase concentration of the modifier composition be kept relatively low and the other components of the modifier be used to bring the RI into the desired range. However, the impact strength obtainable with a given concentration of any core-shell modifier tends to vary directly with the amount of rubber polymer in the modifier. This means that high RI modifiers having low rubber contents have to be exceptionally efficient to produce good toughening.

The average refractive index of a copolymer or a core-shell copolymer having a dimension smaller than the wavelength of light can be estimated as the calculated weight average of the component polymer refractive indices:

$$RI_{CORE-SHELL} = x(RI_{CORE}) + (1-x)(RI_{SHELL}) \quad \text{[Equation 1]}$$

where, $RI_{CORE-SHELL}$ is the total refractive index of the core-shell modifier, $RI_{CORE}$ is the refractive index of the core polymer component, $RI_{SHELL}$ is the refractive index of the shell polymer component, and x is the weight fraction of the rubber core.

One requirement for optimizing the core-shell modifier composition is to make sure that the refractive index of the modifier matches that of the SAN resin ($RI_{SAN}$), so that from Equation 1, $$RI_{SAN} = x(RI_{CORE}) + (1-x)(RI_{SHELL}) \quad \text{[Equation 2]}$$

which can be rearranged to provide an expression for the weight fraction of the rubber core of a RI-matched core-shell modifier for an SAN resin:

$$x = (RI_{SAN} - RI_{SHELL})/(RI_{CORE} - RI_{SHELL}) \quad \text{[Equation 3]}$$

In addition, the refractive indices of copolymers, such as SAN resins, can also be calculated by the weight average of the component polymer refractive indices. For example, $$RI_{SAN} = y(RI_{STYRENE}) + (1-y)(RI_{ACRYLONITRILE}) \quad \text{[Equation 4]}$$

where, $RI_{STYRENE}$ is the refractive index of polystyrene, $RI_{ACRYLONITRILE}$ is the refractive index of polyacrylonitrile, and y is the weight fraction of styrene units in the SAN resin.

Experimental and calculated RIs of several resins and rubbers, and example impact modifiers are indicated in Table 1.

TABLE 1

Refractive Indices of Polymers and Possible Core-shell Polymers for SAN Resins

| Polymer | Refractive Index | | Weight Fraction of Rubber (x) in Core-Shell Modifiers Having a Polystyrene Shell which are Matched RI for SAN Resins | |
|---|---|---|---|---|
| | | | Polybutadiene | Poly-butylacrylate |
| Polymer | Measured[1] | Eqn. 4 | Rubber | Rubber |
| Resins: | | | | |
| Polyacrylonitrile | 1.514 | | N/A | N/A |
| Polystyrene | 1.591 | | | |
| Rubbers: | | | | |
| Polybutyl acrylate | 1.466 | | N/A | N/A |

TABLE 1-continued

Refractive Indices of Polymers and Possible Core-shell Polymers for SAN Resins

| Polymer | Refractive Index | | Weight Fraction of Rubber (x) in Core-Shell Modifiers Having a Polystyrene Shell which are Matched RI for SAN Resins | |
|---|---|---|---|---|
| | | | Polybutadiene | Poly-butylacrylate |
| Polymer | Measured[1] | Eqn. 4 | Rubber | Rubber |
| Polybutadiene | 1.516 | | | |
| SAN Resins: | | | | |
| SAN (81S/19AN) | | 1.576 | 0.195 | 0.117 |
| SAN (76S/24AN) | | 1.573 | 0.246 | 0.148 |
| SAN (75S/25AN) | 1.57 | 1.572 | 0.257 | 0.154 |
| SAN (72S/28AN) | | 1.569 | 0.287 | 0.172 |
| SAN (65S/35AN) | | 1.564 | 0.359 | 0.216 |

[1]D. W. Van Krevelen, "Properties of Polymers", Elsevier, 1990, Table 10.5.

These calculations are not necessarily limited to core-shell polymers wherein the rubber is contained solely in the core; these calculations are readily generalized to various combinations of rubbery and hard polymers (e.g., a core composed of a hard inner portion and /rubbery outer portion). From a practical standpoint the most desirable monomer to produce rubbery polymer for this application is butadiene whose homopolymer has a RI=1.52. It has the best combination of RI, cost, stability, and processability. For the same reasons, styrene is the most desirable component for the rest of the modifier. However, even if butadiene and styrene were the only components of the modifier, a butadiene/styrene ratio ranging from 36/64 to 19/81 would be required for the modifier RI to be in the 1.56 to 1.58 range needed for matching the RIs of SAN resins. Similar modifiers having a polybutyl acrylate ("BA") rubber component would require even less rubber component (a butylacrylate/styrene ratio of 22/78 to 11/89) in order to provide an RI-matched modifier for SAN resins. One skilled in the art of impact modification would therefore expect a 36% concentration of butadiene to be very low for good core-shell modifier efficiency. The results found herein for modification of SAN resins with such functionalized "rubber-poor" modifiers are surprisingly good.

The requirement for a "rubber-poor" modifier can be relaxed somewhat if the vinyl aromatic monomer is changed from styrene, vinyl toluene, para-methylstyrene, monochlorostyrene and the like to one of high refractive index, viz., the polybrominated vinyl aromatics or the polycyclic vinyl aromatics.

The core of the modifier of SAN resin blend composition of the present invention is a rubbery polymer and generally comprises a copolymer of butadiene and a vinyl aromatic monomer. The rubbery polymer may include diene rubber copolymers (e.g., butadiene-styrene copolymer, butadiene-styrene-(meth)acrylate terpolymers, butadiene-styrene-acrylonitrile terpolymers, isoprene-styrene copolymers, etc.). Of the aforementioned rubbery polymers, those which can be produced as a latex are especially desirable. In particular, a butadiene-vinyl aromatic copolymer latex obtained as a result of emulsion polymerization is preferred. In the core, a partially crosslinked polymer can also be employed if crosslinking is moderate. Further, at least one of a cross- or graft-linking monomer, otherwise described as a multi-functional unsaturated monomer, can also be employed. Such monomers include divinylbenzene, diallyl maleate, butylene glycol diacrylate, allyl methacrylate, and the like.

The core of the modifier may also consist of a hard inner portion (e.g., derived mostly from units having a high Tg, such as styrene) and a rubbery outer portion (e.g., derived mostly from units having a low Tg, such as butadiene) so that the overall effect is to provide modifiers which provide enhanced tensile properties when blended with SAN resins.

The ratio of comonomers in the core depends on the desired core-shell ratio and hardness of the rubber phase. The ratio range of butadiene to the vinyl aromatic in the core polymer is 70/30 to 20/80 (parts by weight). If the quantity of butadiene is below 20 parts by weight, it is difficult to improve the impact resistance. If the quantity of butadiene exceeds 70 parts by weight, on the other hand, it is difficult to obtain a high enough RI modifier to match that of the SAN resin, unless the vinyl aromatic monomer is of high refractive index and selected from the polybrominated or polycyclic monomers described above. Optionally, a small concentration, from 0.01 up to 5, and preferably from 0.1 up to 2 percent, by weight of a crosslinking monomer, such as divinyl benzene or butylene glycol dimethacrylate is included, and optionally 0.01 to 5 percent by weight of a graftlinking monomer for tying the core and shell together, such as allyl maleate may be included in the rubbery core polymer. Further examples of crosslinking monomers include alkanepolyol polyacrylates or polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylol-propane triacrylate or trimethylolpropane trimethacrylate, and unsaturated carboxylic acid allyl esters such as allyl acrylate, allyl methacrylate or diallyl maleate. Many of the refractive indices of such monomer components are listed in *The Polymer Handbook*, 3rd Ed., Brandrup and Immergut, Eds., John Wiley, 1989.

As the intermediate stage of the above composition, hard polymers or copolymers of vinyl aromatic monomers are preferred. Generally, polymers or copolymers with a Tg above room temperature can be used. Examples of suitable vinyl aromatic monomers include vinyl aromatic monomers such as styrene, alpha-methyl styrene, para-methyl styrene, chlorostyrene, vinyl toluene, dibromostyrene, tribromostyrene, vinyl naphthalene, isopropenyl naphthalene, benzyl methacrylate, divinyl benzene and the like.

As the shell of the modifier composition, a hydroxyl-group-containing monomer is preferred to be employed. When a hydroxyl group is introduced to the shell polymer, a vinyl monomer containing an active double-bond segment and a hydroxyl group (hereafter referred to as hydroxyl-group-containing monomer) is copolymerized with another copolymerizable vinyl monomer. Examples of the aforementioned hydroxyl-group-containing monomers include hydroxyalkyl (meth)acrylate or alpha-hydroxymethylacrylate esters, such as hydroxyethyl (meth) acrylate, hydroxypropyl (meth)acrylate, or ethyl hydroxymethylacrylate, allyl derivatives of hydroxyl-group containing compounds, such as allyl cellosolve, allyl carbinol, methylvinyl carbinol, allyl alcohol, methallyl alcohol, and the like, vinylphenol, para-vinylbenzyl alcohol, meta-vinylphenethyl alcohol, and the like.

Although the hydroxyalkyl (meth)acrylate monomers are preferred for reasons of safety in handling (over the nitrile-containing monomers) or availability (over other monomers taught herein), other functionalized vinyl monomers which function in a similar manner may be employed, for example, glycidyl methacrylate (GMA), 3,4-epoxybutyl acrylate, acrylonitrile, methacrylonitrile, beta-cyanoethyl methacrylate, beta-cyanoethyl acrylate, cyanoalkoxyalkyl (meth)acrylates, such as omega-cyanoethoxyethyl acrylate, or omega-cyanoethoxyethyl methacrylate, (meth) acrylamide, or N-monoalkyl (meth)acrylamide and the like.

Vinyl aromatic monomers to be copolymerized with the aforementioned hydroxyl-group-containing monomers include vinyl aromatic monomers such as styrene, alpha-methyl styrene, para-methyl styrene, chlorostyrene, vinyl toluene, dibromostyrene, tribromostyrene, vinyl naphthalene, isopropenyl naphthalene, and the like. The hydroxyl-group-containing monomers and vinyl aromatic monomers may be used either singly or in combination of two or more.

In the shell, the ratio between the hydroxyl-group-containing monomer (e.g. HEMA, HPMA) or a monomer which performs in a similar manner (e.g. MAN, AN, or GMA), and the other copolymerizable vinyl monomers (e.g. styrene, tribromostyrene) ranges from 2/98 to 40/60 parts by weight, and preferably 3/97 to 30/70 parts by weight. Below 2 parts, the degree of dispersion of the impact modifier in the SAN resin is not affected compared to the vinyl aromatic homopolymer shell, and above that level, side reactions, such as crosslinking, may occur, with adverse effects on dispersion.

Optionally, one or more additional monomers may be added to the shell to adjust the RI. This additional monomer is preferably an alkyl (meth)acrylate (such as $C_1$–$C_4$ alkyl (meth) acrylate, and the like), but it can be any monomer which copolymerizes with the other two monomers used in the core polymer and produces a terpolymer which permits the RI of the modifier to match that of the SAN resin with which it is blended.

The additional monomer may include one or more of any of the following monomers: acrylonitrile, methacrylonitrile, methyl acrylate, ethyl acrylate, propyl acrylate, butyl acrylate, 2-ethylhexyl acrylate, decyl acrylate, methyl methacrylate, ethyl methacrylate, divinyl benzene and the like.

The resultant composition preferably has a particle size range of 75 to 300 nm, more preferably from 140 nm to 230 nm, and a RI range of 1.56 to 1.58.

It is particularly preferable that the core-shell modifier composition of the modified. SAN resin compositions has (A) from 50 to 70 parts of a core having (1) from 50 to 55 percent by weight of units derived from styrene, (2) from 44.5 to 48 percent by weight of units derived from butadiene, and (3) from 0.5 to 2 percent by weight of units derived from divinyl benzene; (B) from 20 to 30 parts of an intermediate stage having units derived from styrene; and (C) from 10 to 20 parts of an outer shell having (1) from 5 to 15 percent by weight of units derived from hydroxy ethyl methacrylate, (2) from 85 to 95 percent by weight of units derived from styrene, and (3) from 0.1 to 5 percent by weight of units derived from divinyl benzene; the at least one core-shell modifier having a refractive index in the range of from 1.56 to 1.58.

When the modifier composition containing 15–85 parts by weight of the aforementioned rubbery core, 10–50 parts by weight of the intermediate stage, and 5–35 parts by weight of the shell hydroxyl-group-containing polymer (total: 100 parts by weight) is manufactured, conventional methods for manufacturing ordinary rubber-modified polymers (e.g., ABS resin, impact resistant polystyrene, etc.) may be effectively employed. These modifiers may be prepared by emulsion polymerization. The preferred procedure is emulsion polymerization using soaps, initiators and processing conditions normally used for making MBS polymers, that is, modifiers based on butadiene-styrene rubbers with one or more stages of styrene or methyl methacrylate polymers. Isolation from the emulsion can be achieved by standard procedures such as spray drying or coagulation. For example, a polymer latex characterized by an appropriate particle size and degree of conversion is produced by means of emulsion polymerization (e.g. copolymerizing a hydroxyl-group-containing monomer with another copolymerizable vinyl monomer in the presence of a polymerized rubber latex upon which a vinyl aromatic monomer has been polymerized or copolymerized to form an intermediate hard stage).

Further, the polymer can be prepared by a method wherein a core is uniformly graft-polymerized with an intermediate hard stage comprising at least one vinyl aromatic monomer, which is uniformly graft-polymerized with a hydroxyl-group-containing monomer and another copolymerizable vinyl monomer constituting the shell polymer.

Thus, when the modifier composition is manufactured, general free radical polymerization techniques (e.g., emulsion polymerization, solution polymerization, and suspension polymerization) may be employed so long as the resulting modifier composition is characterized by a core-shell structure wherein hydroxyl, groups are preserved.

The modifier composition may be isolated from the reaction medium by any of several known processes. For example, when prepared in emulsion, the composition may be isolated by coagulation, including coagulation in an extruder from which the water is removed as a liquid, or by spray-drying. Additives such as thermal stabilizers and anti-oxidants may be added to the composition prior to, during or after, isolation.

The modifiers and SAN resins may be combined by melt blending in an extruder. A mix of the two components can be directly extruded or injection molded or the components can be combined in an initial blending step and the pellets from this blend can then be molded. The concentration of modifier in these polyester blends can range from 1 to 30% by weight and preferably from 5 to 20% by weight. The blends can be extruded or molded into transparent to translucent parts which have very high elongation at break values, and exhibit ductile type failures and physical aging resistance. The required modifier concentration will depend on factors such as the molecular weight of the SAN resin, the elongation at break desired, and the temperature at which the final object is utilized. Below 1% modifier concentration, no significant effect is seen.

Blends should contain SAN resins having an AN content in the range of from 19 to 35 weight percent for best properties of molding and processing, but for some uses, SAN resins having a lower or higher AN content may be employed. Articles such as sheet, pellets, containers, housings and other molded parts can be prepared from the modified SAN resin compositions described herein. The compositions are generally blended during extrusion and either further extruded into its final form (i.e., sheet or strand for pelletization), or further injection molded into an article. Blending can be accomplished by melt extrusion in an extruder at temperatures of 200 to 250° C., preferably 220° C. to 240° C. For example a high work, two stage screw having a length/diameter ratio of 27/1 and a backpressure of 7.0 to 9.0 bars gives an adequate dispersion of the core-shell modifiers in the SAN resins. A residence time in the extruder of 1 to 3 minutes, preferable 1 to 2 minutes is adequate to ensure a complete mixing and optimal dispersion. Preferably, pellets which are produced from pelletizing strands which are blended, extruded, and cooled in a water bath are further dried at 60° C. for at least four hours.

The ingredients used to make the composition of the invention are dispersed uniformly and it has been found that melt blending the ingredients, by using such equipment as a melt extruder (e.g., single screw extruders or twin screw extruders) in a separate step prior to molding is desirable. The blended product may be pelletized (i.e., the extruded strand is quenched and cut), dried and used for subsequent molding purposes.

Other additives known in the art may be included in the composition at 1 to 30% by weight. These other additives may include antioxidants, flame retardants, reinforcing agents such as glass fiber, asbestos fiber and flake, mineral fillers, stabilizers, nucleating agents, ultraviolet light stabilizers, heat and light stabilizers, lubricants, dyes, pigments, toners, mold release agents, fillers, such as glass beads and talc, and the like. Minor amounts of other polymers (i.e. 1 to 10 percent by weight) can also be incorporated in the present composition, such as polyesters, polyamides, or polycarbonates. Most of these additives will adversely affect clarity. The additives listed above such as antioxidants, thermal stabilizers, fillers, pigments and flame retardant additives may be used in the composition of this invention provided they do not exert any adverse effect on the impact strength or clarity.

SAN resins are typically quite sensitive to thermal softening (reduced Vicat values) when blended with relatively high amounts of modifiers (ca. 20%), but this limitation is overcome by the modifiers herein (see Table 2 in the Examples). Therefore, the modified SAN resin compositions will now be able to compete successfully with polymethylmethacrylate, polycarbonate, cellulosics, impact modified polyvinyl chloride, and the like for a broad range of applications where high clarity and toughness are needed in the absence of exceptional heat resistance.

The type of articles that can be produced with these modified SAN resin blends, whether it be injection molded parts, sheets, films, foams, pipes, tubing, or profiles, will govern the auxiliary equipment to be employed. For instance, to produce injection molded parts, injection molding equipment is necessary. To produce sheet, sheet extrusion equipment is necessary.

EXAMPLES

The following examples are presented to illustrate the invention, but the invention should not be limited by these examples. All parts and percentages are by weight unless otherwise indicated. The following abbreviations are employed in the examples:

Bd=butadiene

S=styrene

AN=acrylonitrile

HEMA=hydroxy ethyl methacrylate

DVB=divinyl benzene.

Preparation of Core-Shell Modifier A

A core-shell modifier having a refractive index of 1.570 (matched for a range of AN-content SAN resins) was prepared according to the following procedure:

Charge 23.319 parts deionized water to a stainless steel reactor capable of withstanding 200 psi (1.38 mPa) pressure.

Add 1.182 parts of a 5% aqueous solution of sodium formaldehyde sulfoxylate. Begin stirring at 130 rpm and heating to 85° C. while sparging with nitrogen (0.283 scmh) for 30 minutes. At 85° C., turn off sparge and add 3.590 parts (33% solids) of a Bd/S (at a ratio of approximately 70:30) seed emulsion, rinse with 0.507 parts deionized water. Evacuate the reactor to 362–414 mm Hg. Begin feeding an emulsified mix of monomers, soap and water to the reactor over a 4.75 hour period. The emulsified monomer mix contains: 14.221 parts S, 0.269 parts DVB, 0.213 parts sodium dodecyl benzene sulfonate soap, 6.606 parts deionized water [and 1.014 parts deionized water rinse]. Feed rates for the emulsified monomer mix change over time: 1.75 hours at 0.1349 parts/minute, 1.25 hours at 0.0766 parts/minute and 1.5 hours at 0.0152 parts/minute. Other feeds are started the same time as the emulsified monomer mix: Bd [12.368 parts] is fed over time starting at 1.75 hours after the start of the emulsified monomers [1.25 hours at 0.0522 parts/minute then 1.5 hours at 0.0938 parts/minute]; 2.377 parts of a 10% aqueous solution of sodium dodecyl benzene sulfonate solution is fed at a constant rate of 0.0088 parts/minute for 4.5 hours; 1.774 parts of a 5% aqueous t-butyl hydroperoxide-solution is added at a constant rate of 0.00657 parts/minute for 4.5 hours. At the end of feeds, rinse with 1.267 parts deionized water.

After rinse is added, charge 0.625 parts of a 5% solution of sodium formaldehyde sulfoxylate to the reactor. Begin feeding an emulsified styrene charge for 2 hours at 0.1373 parts/minute [contains: 11.660 parts S, 0.153 parts sodium dodecyl benzene sulfonate, 0.035 parts t-butyl hydroperoxide, 4.628 parts deionized water (and 0.760 parts rinse of deionized water)].

After rinse is added, charge 0.070 parts of 5% solution of t-butyl hydroperoxide and 0.070 parts of 5% solution of sodium formaldehyde sulfoxylate to the reactor. Hold for 1 hour. Vent the reactor to atmospheric pressure. Begin a constant rate feed of emulsified monomers for 1 hour: 6.142 parts S, 0.840 parts HEMA, 0.014 parts DVB, 0.021 parts t-butyl hydroperoxide, 0.101 parts sodium dodecyl benzene sulfonate, 3.191 parts deionized water (rinse with 0.507 parts deionized water). Feed shots of 5% solution of t-butyl hydroperoxide [1.460 parts] and 5% solution of sodium formaldehyde sulfoxylate [1.016 parts] over 6 hours. A 50% solids emulsion of Irganox 1010 [0.098 parts], Irganox 245 [0.098 parts] and dilauryl thiodipropionate [0.504 parts] is then added. Cool the batch to 60° C.

The overall composition of Modifier A is as follows: 60 parts of a core comprising 52.6 percent by weight of units derived from styrene, 46.4 percent by weight of units derived from butadiene, and 1 percent by weight of units derived from divinyl benzene; 25 parts of an intermediate stage comprising units derived from styrene; and 15 parts of an outer shell comprising 12 percent by weight of units derived from hydroxy ethyl methacrylate, 87.8 percent by weight of units derived from styrene, and 0.2 percent by weight of units derived from divinyl benzene. The RI of the Modifier A was measured to 1.570±0.002, using the method according to ASTM-D-542.

Preparation of Modified SAN Resin Blends According to this Invention

Modified SAN resin blend compositions were prepared by compounding commercially-available unmodified SAN resins having from 19 to 35 weight percent AN with either 10 or 20 parts by weight of Core-Shell Modifier A described above on a 30 mm ZSK twin screw compounder. The extrusion temperatures were (from the hopper to the die): 220° C.; 220° C.; 230° C.; 230° C.; 240° C. screw speed was 150 RPM and the output 10 Kg/Hrs. SAN resins containing 24%, 28%, and 32% AN were obtained from Enichem and SAN resins containing 19%, 25%, and 35% AN were obtained from BASF. The compounded resin blend compositions were subsequently injection molded into various test samples, which were then tested for their tensile, impact, optical, and thermal properties and reported in Tables 2–4 below.

Testing Procedures

Tensile testing of the modified SAN resin blend compositions was performed according to ISO R527 using Type specimen dimensions. These tests were performed using an INSTRON (Canton, Massachusetts) instrument with the extensiometer at the following conditions: distance between grips =115 mm; speed strength=5 mm/min; force transducer=5 KN. Values of the modulus (MPa), stress at break (MPa), and percent elongation at break (%) are recorded in Table 2.

Impact testing of the modified SAN resin blend compositions was done according to ISO 179 1 eU. Charpy impact strength $(KJ/m^2)$ for unnotched stressed and unstressed specimens are recorded in Table 2.

Optical testing was performed using a Hunterlab type DP 9000 instrument (Hunter Associates Laboratory, Inc., Reston, Va.) to measure percent haze according to ASTM D 1003, yellowness index according to ASTM D 1925, and whiteness index (WI) according ASTM E 313. Values of percent haze (%), percent yellowness index (YI) (%), and percent whiteness index (WI) (%) are recorded in Table 3.

Thermal testing of the modified SAN resin blend compositions was measured by the falling dart method according to ASTM D 3029-93 and the Vicat method according to ISO 306-1987, Condition B (5 Kg; 50° C./Hr heating rate). Values of energy (joules and time (msec) were recorded for the falling dart tests and softening temperature (° C.) for the Vicat B tests are recorded in Table 4.

TABLE 2

Tensile and Impact Test Results

| | Composition | | Charpy Impact Un-notched ISO 179 1eU | | Tensile Testing | | |
|---|---|---|---|---|---|---|---|
| Ex. | SAN, % AN | Modifier A, % | Stressed | Unstressed | Modulus (MPa) | Stress at Break (MPa) | Elongation at Break (%) |
| Ref. 1 | 19 | 0 | 15.8 ± 1.5 | — | 4104 | 70.7 | 2.6 |
| 2 | 19 | 10 | 13.8 ± 3.1 | — | 3082 | 64.5 | 2.9 |

TABLE 2-continued

Tensile and Impact Test Results

| | Composition | | Charpy Impact Un-notched ISO 179 leU | | Tensile Testing | | |
|---|---|---|---|---|---|---|---|
| Ex. | SAN, % AN | Modifier A, % | Stressed | Unstressed | Modulus (MPa) | Stress at Break (MPa) | Elongation at Break (%) |
| 3 | 19 | 20 | 15.4 ± 0.5 | — | 2853 | 38.3 | 9.0 |
| Ref. 4 | 24 | 0 | 16.8 ± 0.9 | 14.2 ± 0.8 | 3818 | 68.3 | 2.3 |
| 5 | 24 | 10 | 13.2 ± 1.3 | 14.1 ± 0.8 | 3373 | 58.4 | 4.7 |
| 6 | 24 | 20 | 17.1 ± 2.2 | 18.3 ± 2.5 | 2885 | 42 | 12.4 |
| Ref. 7 | 25 | 0 | 14.8 ± 1.9 | — | 3667 | 71.6 | 2.7 |
| 8 | 25 | 10 | 16.0 ± 0.7 | — | 3292 | 66.2 | 2.7 |
| 9 | 25 | 20 | 15.4 ± 1.7 | — | 2652 | 38.3 | 10.6 |
| Ref. 10 | 28 | 0 | 19.1 ± 1.7 | 18 ± 1 | 4037 | 76.4 | 2.6 |
| 11 | 28 | 10 | 19.0 ± 2.4 | 19.3 ± 2.2 | 3449 | 49 | 10.4 |
| 12 | 28 | 20 | 26.6 ± 6.3 | 30.7 ± 5.3 | 2870 | 44.8 | 12.5 |
| Ref. 13 | 32 | 0 | 17.7 ± 0.8 | 15.9 ± 1.7 | 3783 | 73.6 | 2.6 |
| 14 | 32 | 10 | 14.1 ± 0.8 | 14.4 ± 0.9 | 3395 | 52 | 7.3 |
| 15 | 32 | 20 | 20.4 ± 4.1 | — | 2768 | 42.2 | 12.4 |
| Ref. 16 | 35 | 0 | 19.9 ± 3.1 | — | 3828 | 78.2 | 2.7 |
| 17 | 35 | 10 | 19.2 ± 4.2 | — | 3471 | 46.8 | 9.0 |
| 18 | 35 | 20 | 24.1 ± 6.3 | — | 2802 | 41.6 | 11.8 |

TABLE 3

Optical Test Results

| | Composition | | Optical Testing | | |
|---|---|---|---|---|---|
| Ex. | SAN, % AN | Modifier A, % | Haze (%) | YI (%) | WI (%) |
| Ref. 1 | 19 | 0 | 2.13 | 5.77 | 70.9 |
| 2 | 19 | 10 | 18.07 | 14.4 | 42.6 |
| 3 | 19 | 20 | 34 | 20.15 | 25.8 |
| Ref. 4 | 24 | 0 | 2.46 | 7.1 | 66.5 |
| 5 | 24 | 10 | 10.49 | 16.8 | 35.3 |
| 6 | 24 | 20 | 27.58 | 24.8 | 13.1 |
| Ref. 7 | 25 | 0 | 5.52 | 6.27 | 69.5 |
| 8 | 25 | 10 | 9.97 | 14.5 | 42.6 |
| 9 | 25 | 20 | 29.3 | 24.9 | 12.9 |
| Ref. 10 | 28 | 0 | 3.16 | 10.74 | 54.8 |
| 11 | 28 | 10 | 38.09 | 25.03 | 10.9 |
| 12 | 28 | 20 | 60.41 | 36.6 | −17.6 |
| Ref. 13 | 32 | 0 | 2.51 | 5.95 | 71.07 |
| 14 | 32 | 10 | 14.75 | 18.03 | 31.8 |
| 15 | 32 | 20 | 31.4 | 25.98 | 9.8 |
| Ref. 16 | 35 | 0 | 2.2 | 7.95 | 64.1 |
| 17 | 35 | 10 | 18.9 | 21.2 | 21.3 |
| 18 | 35 | 20 | 44.7 | 35.5 | −14.7 |

TABLE 4

Thermal Test Results

| | Composition | | Falling Dart Test | | Vicat B (5 Kg; 50° C./Hrs) |
|---|---|---|---|---|---|
| Ex. | SAN, % AN | Modifier A, % | Energy (Joules) | Time (msec) | Softening Temp., ° C. |
| Ref. 1 | 19 | 0 | 1.5 | 3.7 | 104.6 |
| 2 | 19 | 10 | 1.49 | 5.4 | 102.6 |
| 3 | 19 | 20 | 1.07 | 3.6 | 100.3 |
| Ref. 4 | 24 | 0 | 1.88 | 3.25 | 101.3 |
| 5 | 24 | 10 | 1.19 | 3.05 | 100.7 |

TABLE 4-continued

Thermal Test Results

| Ex. | Composition SAN, % AN | Modifier A, % | Falling Dart Test Energy (Joules) | Time (msec) | Vicat B (5 Kg; 50° C./Hrs) Softening Temp., ° C. |
|---|---|---|---|---|---|
| 6 | 24 | 20 | 1.46 | 3.31 | 98.6 |
| Ref. 7 | 25 | 0 | 1.34 | 2.6 | 102.8 |
| 8 | 25 | 10 | 1.14 | 4.2 | 101.7 |
| 9 | 25 | 20 | 0.87 | 2.56 | 98.8 |
| Ref. 10 | 28 | 0 | 1.77 | 2.74 | 102.3 |
| 11 | 28 | 10 | 1.77 | 3.25 | 101.3 |
| 12 | 28 | 20 | 1.59 | 4.09 | 99.3 |
| Ref. 13 | 32 | 0 | 1.63 | 2.59 | 101.2 |
| 14 | 32 | 10 | 1.63 | 4.75 | 100.5 |
| 15 | 32 | 20 | 1.5 | 6.04 | 98.6 |
| Ref. 16 | 35 | 0 | 1.79 | 3.4 | 102.7 |
| 17 | 35 | 10 | 1.11 | 2.1 | 101.9 |
| 18 | 35 | 20 | 1.15 | 2.3 | 99.7 |

The impact testing results recorded in Table 2 show that the addition of Modifier A into SAN resins results in impact properties that vary with the AN content of the SAN resin. The modified SAN resin blend composition made with 20% Modifier A and SAN resin having 28% AN leads to the best impact properties.

The tensile testing results recorded in Table 2 show that the addition of Modifier A into SAN results in a significant improvement in the elongation at break value. This makes it possible to use the modified SAN resin blend compositions in injection-molded articles where slight undercuts are present, enabling the articles to be automatically ejected from the injection molding device with reduced breakage. It appears that this improvement in elongation at break value occurs best in SAN resins containing from 28% to 35% weight AN content.

The optical testing results recorded in Table 3 shows that the clarity of the modified SAN resin blend compositions is best when the AN level of the SAN resin is 24% to 25%. This result is consistent with the refractive index comparisons shown in Table 1 as the clarity is expected to be best when the refractive index of the modifier (1.570 for Modifier A) matches that of the SAN resin (SAN containing 25% AN). Unfortunately, the haze value seems to be worst when the SAN has a 28% AN level. This is a surprising result because the calculated refractive index of the SAN resin should be closer to the refractive index of Modifier A than either the low- or high-AN content SAN resins. It is conjectured that the high haze value in the modified 28% AN compositions may be the result of poor dispersion of the modifier in the SAN resin matrix.

The thermal test results recorded in Table 4 shows that the reduction in Vicat softening temperatures is limited to only about 3° C. even when the modified SAN resin blend composition contains up to 20% modifier. It is very beneficial for such modified blend compositions to have only a small reduction in the thermal resistance compared to the unmodified resin.

We claim:

1. A modified SAN resin composition comprising:
   (I) from 70 to 99 parts of at least one SAN resin having a refractive index of from 1.56 to 1.58; and
   (II) from 1 to 30 parts of at least one core-shell modifier comprising
      (A) from 15 to 85 parts of a core comprising
         (1) from 40 to 60 percent by weight of units derived from at least one vinyl aromatic monomer,
         (2) from 20 to 60 percent by weight of units derived from at least one 1,3-diene,
         (3) up to 10 percent by weight of units derived from at least one copolymerizable vinyl or vinylidene monomer, and
         (4) up to 5 percent by weight of units derived from at least one graft-linking or cross-linking monomer;
      (B) from 10 to 50 parts of an intermediate stage comprising at least 25 percent by weight of units derived from at least one vinyl aromatic monomer; and
      (C) from 5 to 35 parts of an outer shell comprising
         (1) from 2 to 40 percent by weight of units derived from at least one hydroxyalkyl (meth)acrylate,
         (2) from 60 to 98 percent by weight of units derived from at least one vinyl aromatic monomer,
         (3) up to 25 percent by weight in the shell of units derived from one or more copolymerizable vinyl or vinylidene monomer, and
         (4) up to 5 percent by weight of units derived from at least one graft-linking or cross-linking monomer;
   the at least one core-shell modifier having a refractive index in the range of from 1.56 to 1.58.

2. The composition of claim 1 wherein the core (A) of the at least one core-shell modifier (II) comprises
   (1) from 10 to 50 parts based upon the modifier of an inner stage comprising at least 80 percent of units derived from at least one vinyl aromatic monomer, up to 20 percent of units derived from at least one other copolymerizable vinyl or vinylidene monomer, up to 20 percent by weight of units derived from at least one 1,3-diene, and up to 5 percent by weight of units derived from at least one graft-linking or cross-linking monomer; and
   (2) from 5 to 75 parts based upon the modifier of an outer stage comprising up to 60 percent by weight of units derived from a vinyl aromatic monomer, at least 30 percent by weight of units derived from at least one 1,3-diene, up to 10 percent by weight of units derived from at least one copolymerizable vinyl or vinylidene monomer, and up to 5 percent by weight of units derived from at least one graft-linking or cross-linking monomer.

3. The composition of claim 1 wherein the outer shell (C) of the at least one core-shell modifier (II) comprises a plurality of stages.

4. The composition of any one of claims 1, 2 or 3 wherein the vinyl aromatic monomer of the at least one core-shell modifier (II) is selected from styrene, para-methyl styrene, alpha-methyl styrene, chlorostyrene, vinyl toluene, bromostyrene, dibromostyrene, tribromostyrene, isopropenyl napthalene, or vinyl naphthalene, and where the 1,3-diene is butadiene.

5. The composition of any one of claims 1, 2 or 3 wherein the hydroxyalkyl (meth)acrylate of the at least one core-shell modifier (II) is selected from hydroxyethyl (meth)acrylate or hydroxypropyl (meth)acrylate.

6. The composition of any one of claims 1, 2, or 3 wherein the at least one SAN resin contains from 19% to 35% AN.

7. The composition according to claim 1 having:
(I) from 80 to 90 parts of at least one SAN resin having a refractive index of from 1.56 to 1.58; and
(II) from 10 to 20 parts of at least one core-shell modifier comprising
(A) from 50 to 70 parts of a core comprising
(1) from 50 to 55 percent by weight of units derived from styrene,
(2) from 44.5 to 48 percent by weight of units derived from butadiene, and
(3) from 0.5 to 2 percent by weight of units derived from divinyl benzene;
(B) from 20 to 30 parts of an intermediate stage comprising units derived from styrene; and
(C) from 10 to 20 parts of an outer shell comprising
(1) from 5 to 15 percent by weight of units derived from hydroxy ethyl methacrylate,
(2) from 85 to 95 percent by weight of units derived from styrene, and
(3) from 0.1 to 5 percent by weight of units derived from divinyl benzene;
the at least one core-shell modifier having a refractive index in the range of from 1.56 to 1.58.

8. The composition according to claim 7 wherein the at least one SAN resin (I) contains from 19% to 35% by weight AN.

9. The composition according to claim 7 wherein the at least one SAN resin (I) comprises an azeotropic composition of AN and S monomers.

10. The composition of claim 2 wherein the outer shell (C) of the at least one core-shell modifier (II) comprises a plurality of stages.

11. Articles produced from the composition of any one of claims 1, 2, 3, 7, 8, 9, or 10.

12. Articles produced from the composition of claim 4.

13. Articles produced from the composition of claim 5.

14. Articles produced from the composition of claim 6.

* * * * *